United States Patent
Abdel-Rahman et al.

(10) Patent No.: US 10,195,994 B2
(45) Date of Patent: Feb. 5, 2019

(54) VEHICLE SIDE MIRROR AUTOMATION

(71) Applicant: GM GLOBAL TECHNOLOGY OPERATIONS LLC, Detroit, MI (US)

(72) Inventors: Akram M. Abdel-Rahman, Ajax (CA); Mohannad Murad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 50 days.

(21) Appl. No.: 15/482,574

(22) Filed: Apr. 7, 2017

(65) Prior Publication Data

US 2018/0290594 A1 Oct. 11, 2018

(51) Int. Cl.
*B60R 1/06* (2006.01)
*B60R 1/062* (2006.01)
*B60R 1/12* (2006.01)

(52) U.S. Cl.
CPC .............. *B60R 1/0607* (2013.01); *B60R 1/06* (2013.01); *B60R 1/062* (2013.01); *B60R 1/0612* (2013.01); *B60R 2001/1223* (2013.01); *B60R 2001/1253* (2013.01)

(58) Field of Classification Search
CPC ....... B60R 1/0607; B60R 1/06; B60R 1/0612; B60R 1/062; B60R 2001/1223; B60R 2001/1253; G02B 7/182
USPC ........ 359/841, 843, 872, 876, 877; 296/1.11
See application file for complete search history.

(56) References Cited

U.S. PATENT DOCUMENTS

| 6,151,175 A * | 11/2000 | Osha ....................... B60R 1/025 33/264 |
| 6,880,941 B2 * | 4/2005 | Suggs ..................... B60R 1/025 359/843 |
| 9,010,946 B1 * | 4/2015 | Setnor ..................... B60R 1/006 359/843 |
| 2007/0263301 A1 * | 11/2007 | Agrest .................... B60R 1/025 359/843 |
| 2010/0017071 A1 * | 1/2010 | Ryu ......................... B60R 1/02 701/49 |
| 2014/0168438 A1 * | 6/2014 | Park ....................... H04N 7/183 348/148 |
| 2018/0109764 A1 * | 4/2018 | Schofield ............... B60C 23/00 |

* cited by examiner

*Primary Examiner* — Frank G Font
(74) *Attorney, Agent, or Firm* — Lorenz & Kopf, LLP

(57) ABSTRACT

Methods and systems are provided for automation of a side mirror of a vehicle. In one example, a side mirror is disposed on a side of the vehicle, and a camera is mounted on the side mirror. A processor is configured to at least facilitate determining whether a condition has been satisfied with respect to a vehicle having a side mirror, and providing instructions for automatic movement of the side mirror from a first position to a second position, when it is determined that the condition has been satisfied. An actuator is coupled to the processor, and is configured to move the side mirror from the first position to the second position based on the instructions provided by the processor when it is determined that the condition has been satisfied.

18 Claims, 8 Drawing Sheets

VEHICLE SIDE MIRROR AUTOMATION

TECHNICAL FIELD

The technical field generally relates to the field of vehicles and, more specifically, to methods and systems for automating side mirrors of vehicles.

BACKGROUND

Side mirrors of vehicles can be important for a user's operation of the vehicle. However, in certain instances standard mirror position and operation may not be optimal for all uses.

Accordingly, it is desirable to provide improved methods and systems for operating side mirrors of vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided. The method includes the steps of determining whether a condition has been satisfied with respect to a vehicle having a side mirror; and automatically moving the side mirror from a first position to a second position, via instructions provided by a processor to an actuator, when it is determined that the condition has been satisfied.

In accordance with another exemplary embodiment, a system is provided. The system includes a processor and an actuator. The processor is configured to at least facilitate determining whether a condition has been satisfied with respect to a vehicle having a side mirror; and providing instructions for automatic movement of the side mirror from a first position to a second position, when it is determined that the condition has been satisfied. The actuator is coupled to the processor, and is configured to move the side mirror from the first position to the second position based on the instructions provided by the processor when it is determined that the condition has been satisfied.

In accordance with a further exemplary embodiment, a vehicle is provided. The vehicle includes a side mirror, a camera, a processor, and an actuator. The side mirror is disposed on a side of the vehicle. The camera is mounted on the side mirror. The processor is configured to at least facilitate determining whether a condition has been satisfied with respect to a vehicle having a side mirror; and providing instructions for automatic movement of the side mirror from a first position to a second position, when it is determined that the condition has been satisfied. The actuator is coupled to the processor, and is configured to move the side mirror from the first position to the second position based on the instructions provided by the processor when it is determined that the condition has been satisfied.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
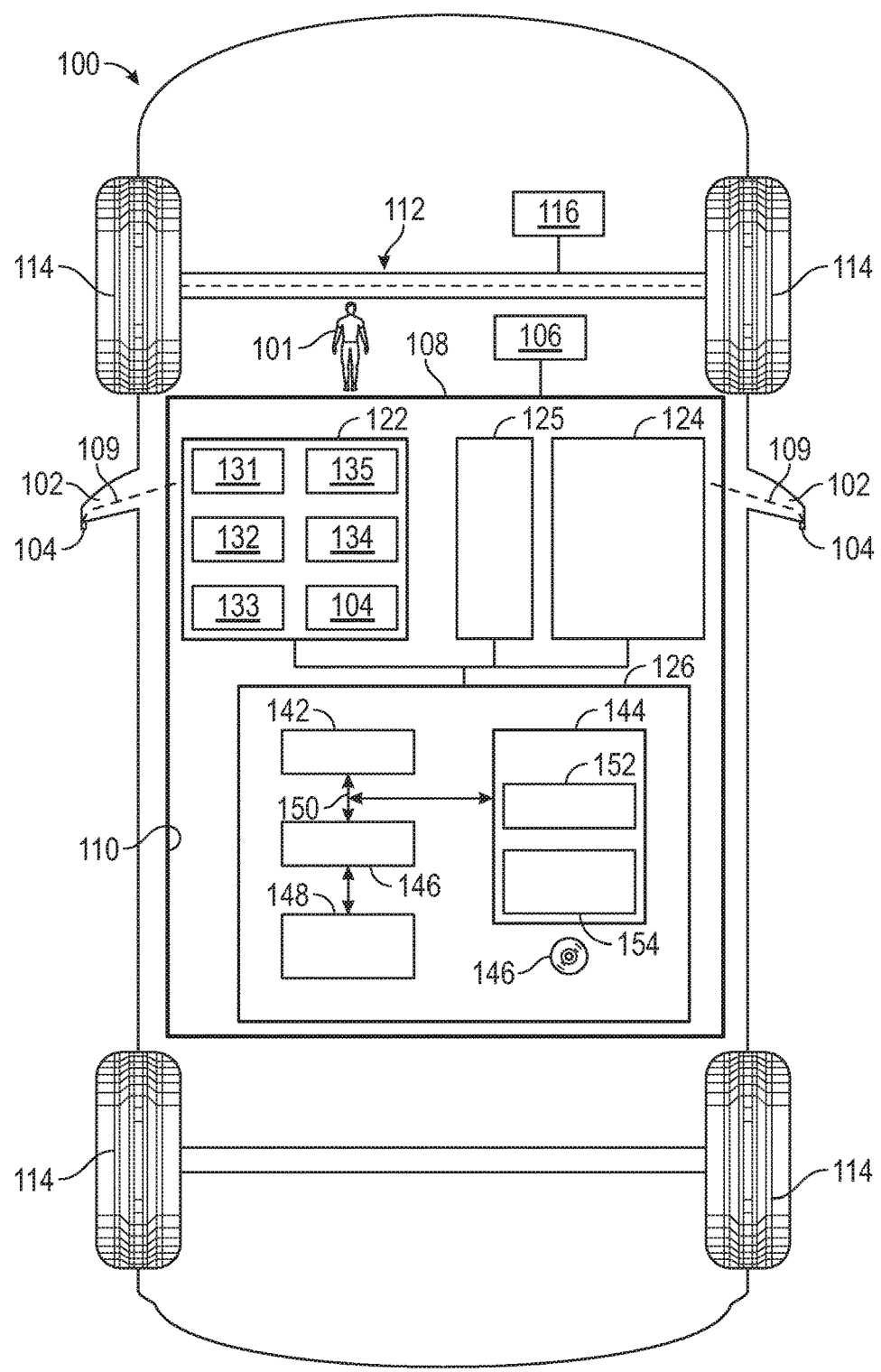
FIG. 1 is a functional block diagram of a vehicle that includes side mirrors, cameras, and a control system for controlling the side mirrors and the cameras.

FIG. 1 illustrates a vehicle 100, according to an exemplary embodiment. As described in greater detail further below, the vehicle 100 includes side mirrors 102, cameras 104 mounted on the side mirrors 102, and a control system 108. In various embodiments, the side mirrors 102 are automatically moved between different positions based on one or more conditions, resulting in different fields of view for the mounted cameras 104, for example as discussed further below in connection with FIG. 1 as well as FIGS. 2-8.

In various embodiments, the vehicle 100 comprises an automobile. The vehicle 100 may be any one of a number of different types of automobiles, such as, for example, a sedan, a wagon, a truck, or a sport utility vehicle (SUV), and may be two-tire drive (2WD) (i.e., rear-tire drive or front-tire drive), four-tire drive (4WD) or all-tire drive (AWD), and/or various other types of vehicles in certain embodiments. In certain embodiments, the vehicle 100 may also comprise a motorcycle or other vehicle, or other system having a camera image with a fixed referenced point.

The vehicle 100 includes a body 110 that is arranged on a chassis 112. The body 110 substantially encloses other components of the vehicle 100. The body 110 and the chassis 112 may jointly form a frame. The vehicle 100 also includes a plurality of wheels 114. The wheels 114 are each rotationally coupled to the chassis 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in various embodiments the side mirrors 102 are attached to the body 110 of the vehicle 100, on opposing sides of the vehicle 100. For example, in the depicted embodiment, one side mirror 102 is attached on a driver side of the vehicle 100, and another side mirror 102 is attached on a passenger side of the vehicle 100. As described in greater detail further below, the side mirrors 102 are automatically moved between different positions via the control system 108 based on one or more conditions, resulting in different fields of view for the mounted cameras 104.

As depicted in FIG. 1 and noted above, in various embodiments, the cameras 104 are mounted on the side mirrors 102. In certain embodiments, one camera 104 is disposed proximate an end of each side mirror 102, for example as depicted in FIG. 1. In various embodiments, the cameras 104 provide images of surroundings around the vehicle 100, including of any individuals near the vehicle 100, for example when the vehicle 100 is parked and/or under other appropriate situations.

In various embodiments, the images from the cameras 104 are processed by the control system 108 and are recorded and/or provided to a user of the vehicle 100 (e.g., user 101 depicted in FIG. 1) under appropriate circumstances. Also in certain embodiments, the cameras 104 provides images for viewing on one or more displays 106 that are disposed inside the vehicle 100 (e.g., a display screen inside the body or cabin of the vehicle 100) and/or outside the vehicle 100 (e.g., as in the case with a smart phone) the vehicle 100. In various embodiments, the displays 106 may be located as part of a front dash, control panel, rear view mirror, and/or navigation system, and/or in one or more other locations inside and/or outside the vehicle 100.

In various embodiments, the control system 108 is disposed within the body 110 of the vehicle 100. In one embodiment, the control system 108 is mounted on the chassis 112. The control system 108 controls operation of the side mirrors 102 and the cameras 104. In various embodiments, the control system 108 also controls the displays 106, and provides notifications and/or actions based on the operation of the side mirrors 102 and/or cameras 104 and/or conditions pertaining thereto. In various embodiments, the control system 108 provides these and other functions in accordance with steps of the process 200 described further below in connection with FIGS. 2-8. In certain embodiments, the control system 108 may be disposed outside the body 110, for example on a remote servo server, in the cloud, or in a remote smart phone or other device where image processing is performed remotely.

Also as depicted in FIG. 1, in various embodiments the control system 108 is coupled to the camera 104 via a communication link 109, and receives camera images from the camera 104 via the communication link 109. In certain embodiments, the communication link 109 comprises one or more wired connections, such as one or more cables (e.g. coaxial cables and/or one or more other types of cables), and/or one or more wireless connections (e.g. using wireless bus technology).

As depicted in FIG. 1, the control system 108 includes a sensor array 122, an actuator 125, and a controller 126. Also as depicted in FIG. 1, in certain embodiments the control system 108 also includes a transceiver 124. In certain embodiments, the images from the camera 104 may be received by the control system 108 via one or more transceivers 124 and/or components thereof (e.g. a receiver).

The sensor array 122 includes one or more sensors for obtaining information for use by the control system 108, for example pertaining to the side mirrors 102 and the cameras 104. Specifically, in various embodiments, the sensor array 122 includes the cameras 104 as well as one or more additional detection sensors 131 (e.g., radar, lidar, sonar), gear selection sensors 132 (e.g., for detecting a gear or transmission status of the vehicle 100, such as "park", "reverse", "drive", "neutral", and so on), one or more ignition sensors 133 (e.g., sensors for ignition systems that are used for determining when a vehicle ignition is turned off or on, for example, via a key, start button, remote keyfob, or the like), one or more input sensors 134 (e.g., sensors detecting a user's inputs, e.g., via a button, touch panel, or the like, as to a requested position for the side mirrors 102—e.g., folded or unfolded), and/or one or more event detection sensors 135 (e.g., airbag sensors, for detection of when a vehicle event occurs, such as might result in a deployment of an airbag of the vehicle 100, or that may require third party assistance). In various embodiments, the various sensors of the sensor array 122 are disposed on or within the vehicle 100.

The transceiver 124 sends and receives various inputs, data, and/or other information. In certain embodiments, the transceiver 124 receives inputs from a user of the vehicle 100, for example regarding a desired position for the side mirrors 102. Also in certain embodiments, the transceiver 124 receives other data or information pertaining to the side mirrors 102 and/or the cameras 104, for example pertaining to movement and/or operation thereof. In addition, in certain embodiments, the transceiver 124 provides for, or facilitates, transmission of images from the cameras 104, for example from the cameras 104 to the controller 126, and/or from the controller 126 to a user of the vehicle 100.

The actuator 125 is used to move the side mirrors 102 between one or more positions. In certain embodiments, the actuator 125 receives and implements instructions from the controller 126 for folding the side mirrors between a folded position and an unfolded position under appropriate circumstances, for example based on whether or not the vehicle 100 is parked.

The controller 126 processes data and inputs provided by the sensors of the sensor array 122 and/or received via the transceiver 124. The controller 126 controls operation of the side mirrors 102 (e.g., via instructions provided to the actuator 125) and the cameras 104 based on the data and inputs. In various embodiments, the controller 126 also utilizes images from the cameras 104, for example for display via the one or more displays 106, for transmission or streaming via the transceiver 124, and/or for storage in memory 144 (described below). In various embodiments, the controller 126 provides these and other functions in accordance with the steps discussed further below in connection with the schematic drawings of the vehicle 100 in FIG. 1 and the additional drawings of FIGS. 2-8 in connection with the process 200 discussed further below).

In one embodiment, the controller 126 is coupled to the side mirrors 102 (e.g., via the actuator 125), the camera 104, the displays 106, the sensor array 122, and the transceiver 124. Also in one embodiment, the controller 126 is disposed within the control system 108, within the vehicle 100. In certain embodiments, the controller 126 (and/or components thereof, such as the processor 142 and/or other components) may be part of the camera 104, disposed within the camera 104, and/or disposed proximate the camera 104. Also in certain embodiments, the controller 126 may be disposed in one or more other locations of the vehicle 100. In addition, in certain embodiments, multiple controllers 126 may be utilized (e.g. one controller 126 within the vehicle 100 and another controller within the camera 104), among other possible variations. In addition, in certain embodiments, the controller can be placed outside vehicle, such as in a remote server, in the cloud or on a remote smart device.

As depicted in FIG. 1, the controller 126 comprises a computer system. In certain embodiments, the controller 126 may also include one or more of the sensors of the sensor array 122, the transceiver 124 and/or components thereof, the camera 104 and/or components thereof, one or more displays 106 and/or components thereof, and/or one or more other devices and/or systems and/or components thereof. In addition, it will be appreciated that the controller 126 may otherwise differ from the embodiment depicted in FIG. 1. For example, the controller 126 may be coupled to or may otherwise utilize one or more remote computer systems and/or other control systems, for example as part of one or more of the above-identified vehicle 100 devices and systems.

In the depicted embodiment, the computer system of the controller 126 includes a processor 142, a memory 144, an interface 146, a storage device 148, and a bus 150. The processor 142 performs the computation and control functions of the controller 126, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 126 and the computer system of the controller 126, generally in executing the processes described herein, such as the process 200 described further below in connection with FIGS. 2-8.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with stored values 154 (e.g., video images and/or other images from the cameras 104).

The bus 150 serves to transmit programs, data, status and other information or signals between the various components of the computer system of the controller 126. The interface 146 allows communication to the computer system of the controller 126, for example from a system driver and/or another computer system, and can be implemented using any suitable method and apparatus. In one embodiment, the interface 146 obtains the various data, inputs, and other information from the sensors of the sensor array 122 and/or the transceiver 124. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 152 that executes one or more embodiments of one or more processes of the present disclosure, such as the steps of the process 200 (and any sub-processes thereof) described further below in connection with FIGS. 2-8. In another exemplary embodiment, the program product may be directly stored in and/or otherwise accessed by the memory 144 and/or a disk (e.g., disk 147), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 126 may also otherwise differ from the embodiment depicted in FIG. 1, for example in that the computer system of the controller 126 may be coupled to or may otherwise utilize one or more remote computer systems and/or other control systems.

Figure 2:
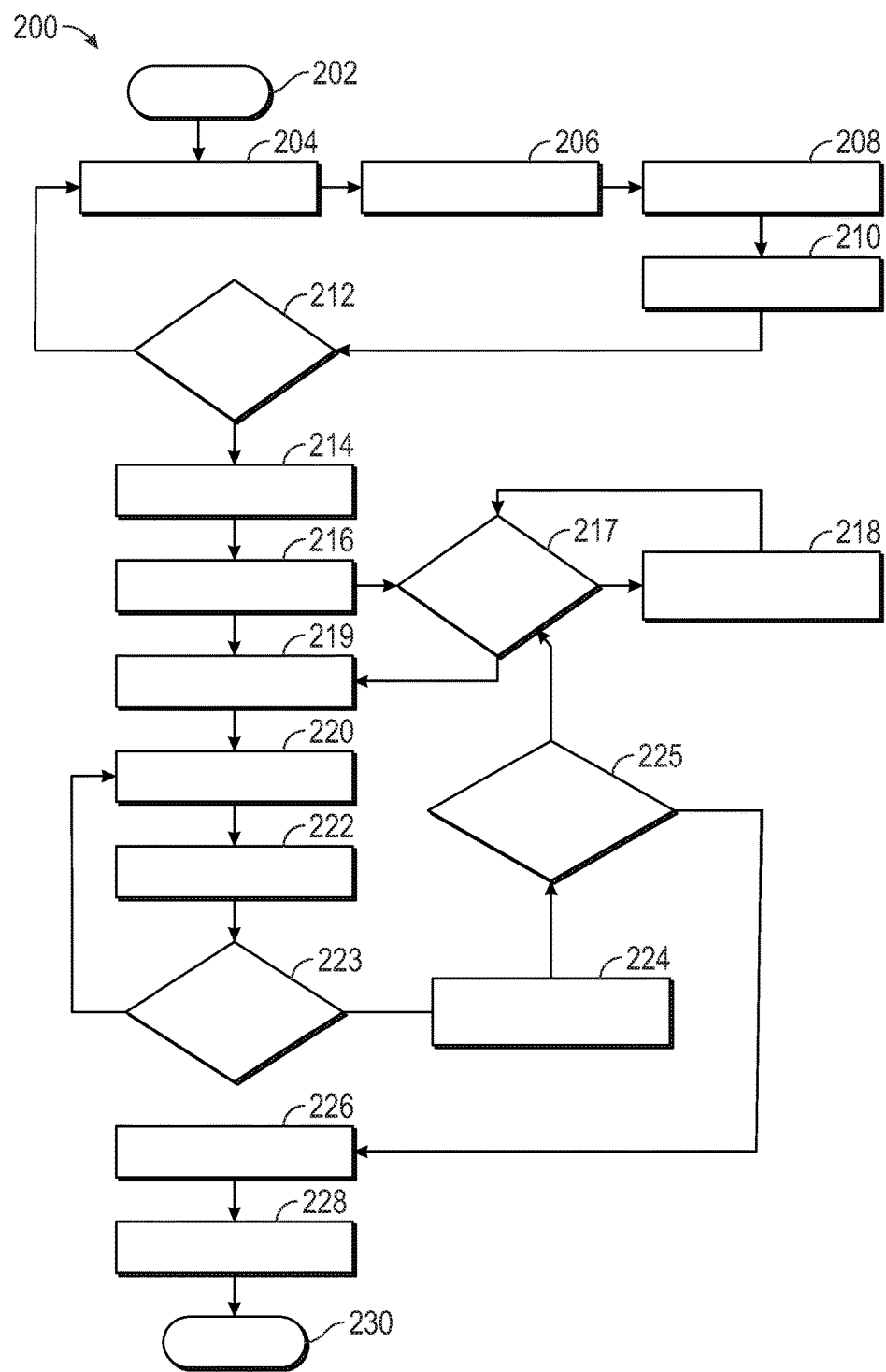
FIG. 2 is a flowchart of a first process for controlling side mirrors and cameras of a vehicle, and that can be implemented in connection with the vehicle, side mirrors, cameras, and control system of FIG. 1, in accordance with an exemplary embodiment.

FIG. 2 is a flowchart of a process 200 for controlling side mirrors and cameras of a vehicle, in accordance with an exemplary embodiment. The process 200 can be implemented in connection with the vehicle 100, the side mirrors 102, cameras 104, and the control system 108 of FIG. 1, in accordance with an exemplary embodiment. The process 200 of FIG. 2 will also be discussed further below in connection with FIGS. 3-8, which provide illustrations of various possible positions and movement for a side mirror 102 of the vehicle 100, in accordance with exemplary embodiments.

As depicted in FIG. 2, the process 200 begins at step 202. In various embodiments, the process 200 begins at step 202 when a vehicle drive or ignition cycle begins (for example when a driver approaches or enters the vehicle, or when the driver turns on the vehicle and/or an ignition therefor, e.g., by turning a key, engaging a keyfob or start button, and so on), and continues thereafter, preferably throughout and after the duration of the vehicle drive or ignition cycle.

As depicted in FIG. 2, in one embodiment, vehicle data is obtained at step 204. In certain embodiments, the data is obtained via the sensor array 122, for example from one or more gear selection sensors 132 and/or ignition sensors 133 of FIG. 1. In various embodiments, the vehicle data is obtained during step 202 via a vehicle CAN bus. In certain other embodiments, the vehicle data may be obtained via one or more messages along a communication link, such as the communication link 109 of FIG. 1, and/or via the transceiver 124 of FIG. 1. In various embodiments, the data includes various data pertaining to operation of the vehicle 100, including a selected gear of the vehicle 100 (e.g., as detected via the gear selection sensors 132 of FIG. 1), an ignition state of the vehicle 100 (e.g., as detected via the ignition sensors 133 of FIG. 1), the occurrence of a vehicle event (e.g., as detected by the event detection sensors 135, such as when an airbag is deployed), and so on. In various embodiments, vehicle data is obtained at step 204, preferably continuously, throughout the process 200.

In certain embodiments, one or more vehicle states are determined (step 206). In certain embodiments, during step 202 a determination is made as to a gear or transmission state of the vehicle 100 (e.g., park, drive, reverse, neutral), for example as determined using data or information provided by the gear selection sensors of 132 of FIG. 1. In addition, in certain embodiments, during step 202 a determination is made as to whether an ignition of the vehicle 100 is turned off (e.g., via keys, a start button, a keyfob, or the like), for example as determined using data or information provided by the ignition sensors 133. In certain embodiments, the vehicle 100 is determined to be parked if the vehicle 100 is in a "park" gear, the ignition is turned off, or both. Also in certain embodiments, during step 206 a determination is made as to whether a vehicle event has occurred (e.g., if an airbag has deployed), for example as determined using data or information from the event detection sensors 135 of FIG. 1. In various embodiments, the determinations of step 206 are made using the processor 142 of FIG. 1 based on the data and information from the respective sensors of the sensor array 122 of FIG. 1. In various embodiments, vehicle states are determined at step 206, preferably continuously, throughout the process 200.

Also in certain embodiments, one or more objects are detected in proximity to the vehicle (step 208). In various embodiments, objects, including any humans in proximity to the vehicle 100, are detected via the cameras 104 and/or other detection sensors 131 of FIG. 1 (e.g., radar, lidar, sonar, or the like). In various embodiments, the object detection is performed at step 208, preferably continuously, throughout the process 200.

In addition, in certain embodiments, user inputs are obtained (step 210). In various embodiments, the user inputs pertain to a user's preference as to a desired position for the side mirrors 102 of FIG. 1 (e.g., as to an unfolded position versus a folded position). Also in certain embodiments, the user inputs may be obtained via the input sensors 134 of FIG. 1 (e.g., from a button, knob, touch screen, or other input device), and/or via the transceiver 124 of FIG. 1. In various embodiments, the user inputs are obtained at step 210, preferably continuously, throughout the process 200.

A determination is made as to whether a mirror condition is satisfied (step 212). In various embodiments, the processor 142 of FIG. 1 determines whether a condition is satisfied that would warrant movement of the side mirrors 102 of FIG. 1 from a first position to a second position, based on the data and information of steps 204-210). In certain embodiments, such a mirror condition is satisfied when the vehicle 100 is parked (e.g., as determined when the vehicle 100 has a gear selection of a "park" gear", the ignition is turned off, or both). Also in certain embodiments, such a mirror condition is satisfied when a vehicle event has occurred (e.g., when an airbag of the vehicle 100 has deployed). In addition, in certain embodiments, such a mirror condition is satisfied when a user has requested that the mirror be moved to the second position (e.g., via engaging a button, knob, touch screen, or other input device on the vehicle 100, or via a smart phone or other electronic device of the user, and so on). Also in certain embodiments, such a mirror condition is detected based at least in part on a detected object (e.g., if a moving person or object is detected near the vehicle 100 while the vehicle is parked), and so on. In various embodiments, the determination(s) of step 212 are made via the processor 142 of FIG. 1.

If it is determined at step 212 that a mirror condition is satisfied, then one or more mirror instructions are provided (step 214). In various embodiments, during step 214, the processor 142 of FIG. 1 provides instructions for movement of the mirror. In certain embodiments, the processor 142 provides instructions for the actuator 125 of FIG. 1 to move the side mirrors 102 of FIG. 1 from a first position to a second position. In certain other embodiments, the processor 142 of FIG. 1 provides instructions (e.g., to the display 106 and/or transceiver 124) to provide a notification or suggestion for the user to move the side mirrors 102 from the first position to the second position.

Figure 3:
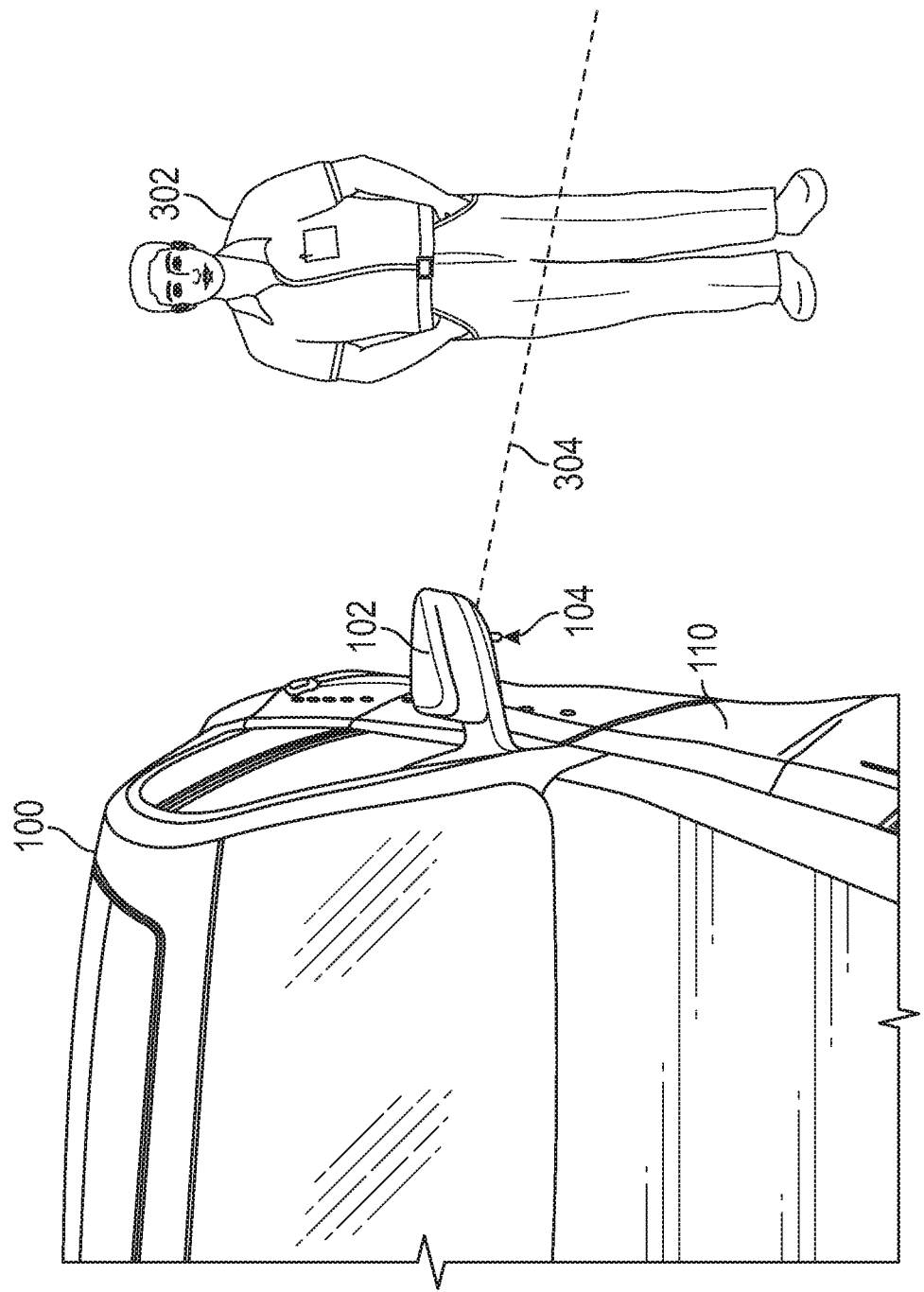
FIGS. 3-8 provide illustrations of various possible positions and movement for a side mirror of a vehicle, in accordance with the vehicle 100 of FIG. 1 and the process 200 of FIG. 2, in accordance with exemplary embodiments.
Figure 4:
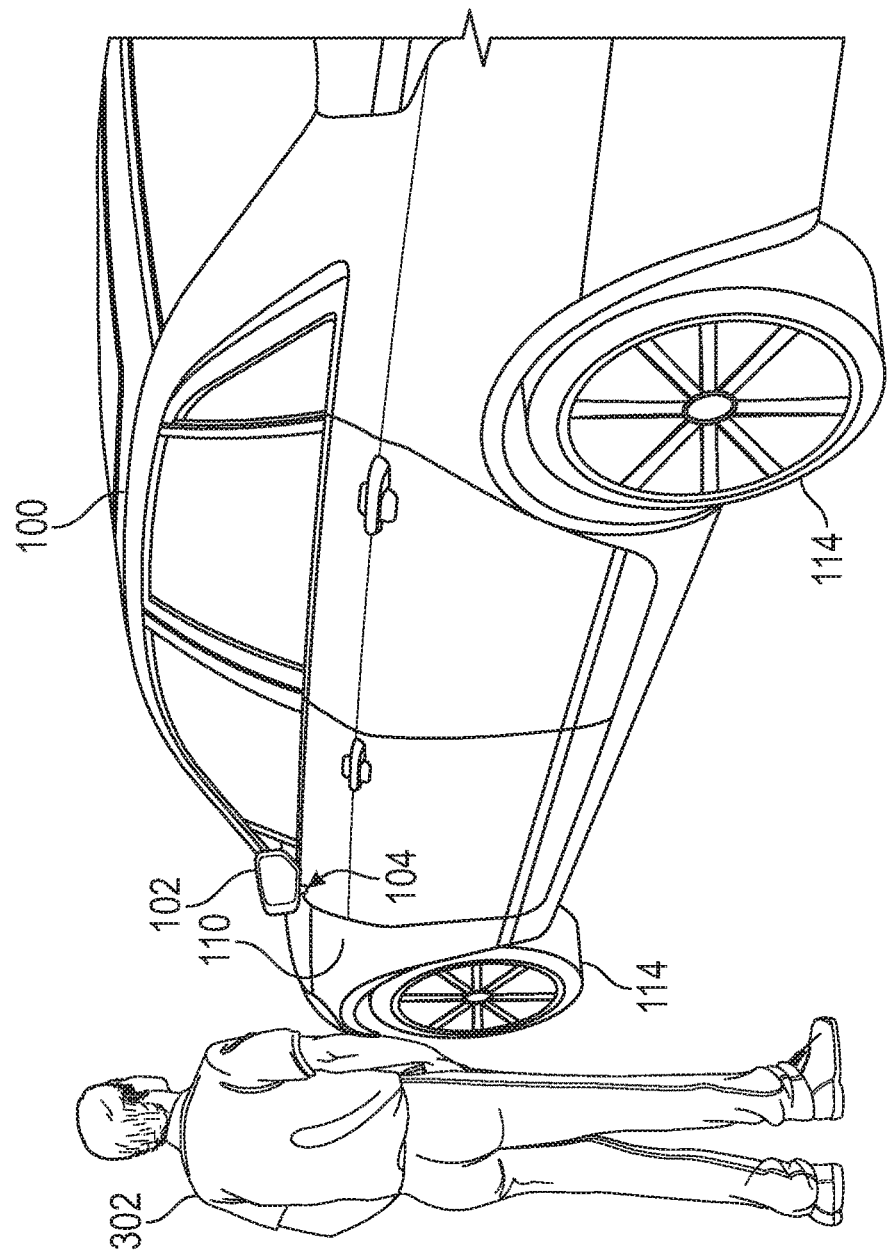
Figure 5:
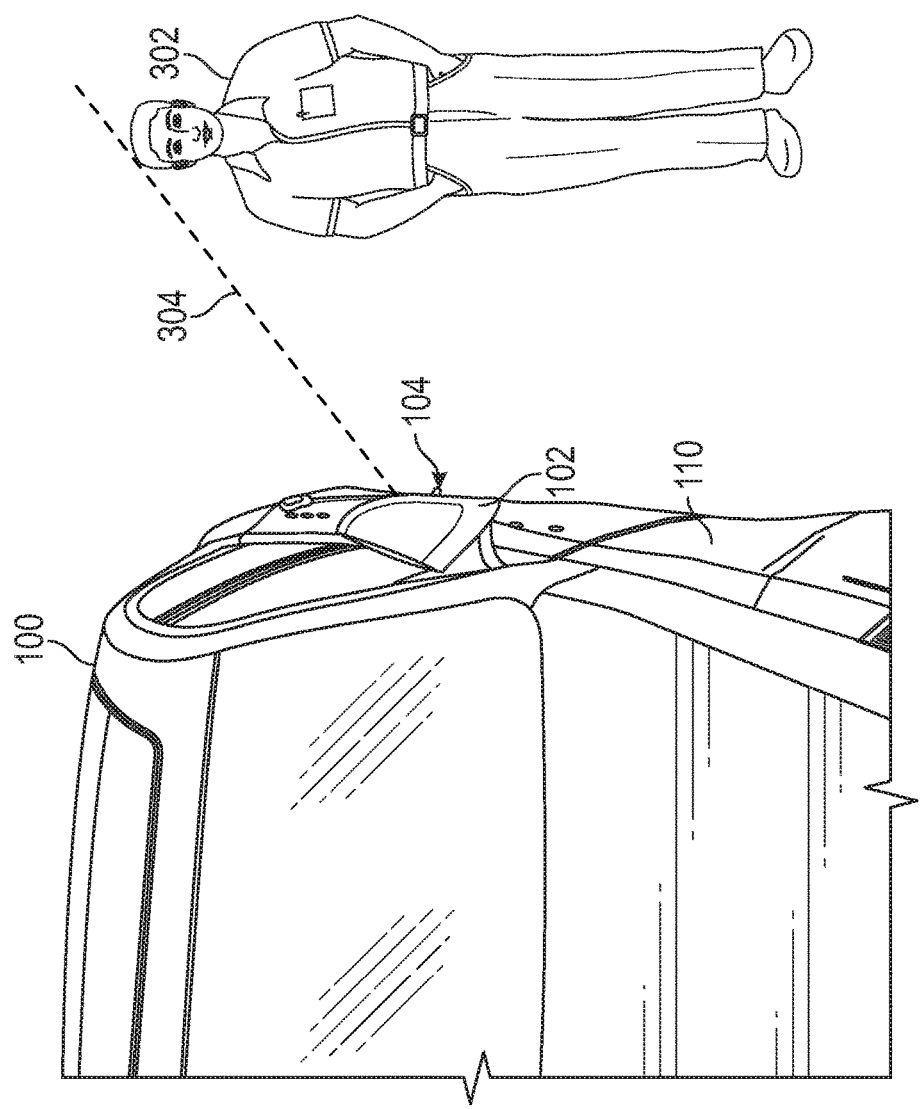
Figure 6:
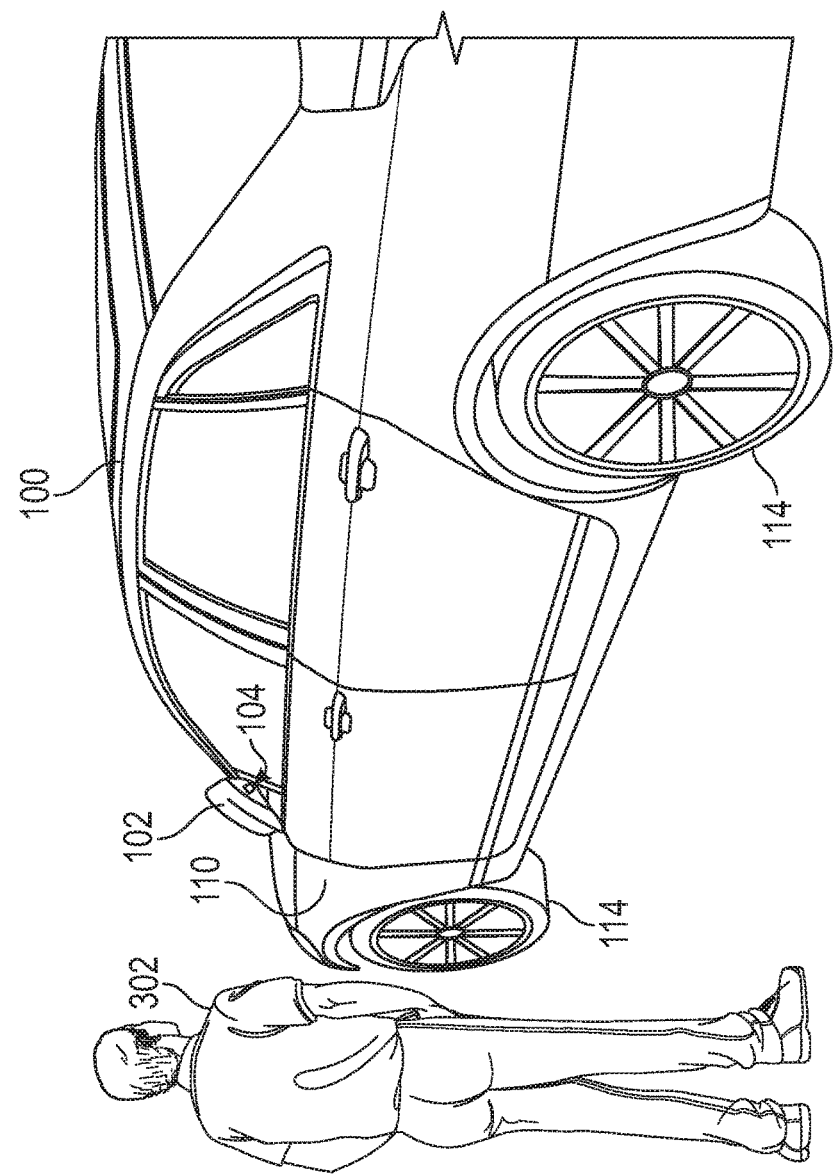

In various embodiments, when in the first position, the side mirrors 102 are unfolded, for example as shown in FIGS. 3 and 4 (discussed further below). Conversely, also in various embodiments, when in the second position, the side mirrors 102 are folded toward the body 110 of the vehicle 100, for example as shown in FIGS. 5 and 6 (also discussed further below).

The mirror instructions are implemented (step 216). In certain embodiments, the actuator 125 implements the instructions from the processor 142 in moving the side mirrors 102 from the first position to the second position, for example by folding the side mirrors 102. In certain other embodiments, the display 106 implements the instructions by providing a notification (e.g., visual and/or audio, within the vehicle 100) for the user to move the side mirrors 102 from the first position to the second position, and/or the transceiver 124 implements the instructions by providing a notification (e.g., via an e-mail or text message to an electronic device of the user) for the user to move the side mirrors 102 from the first position to the second position.

In certain embodiments, a determination is made as to one or more camera conditions are satisfied (step 217). In various embodiments, a camera condition comprises a condition for which images from the cameras 104 are desired. In certain embodiments, a camera condition is satisfied automatically whenever the side mirrors are moved to the second (e.g., folded) position. In certain other embodiments, this determination is made by the processor 142 based on continued data received from steps 204-210 above. For example, in one embodiment, a camera condition is satisfied when another object (e.g., a person) is detected in close proximity (e.g., within a predetermined distance from) of the vehicle 100. In another embodiment, a camera condition is satisfied when movement of another object (e.g., a person) is detected in close proximity of the vehicle 100. Also in certain embodiments, a camera condition is satisfied when a user request is made for activation of the cameras 104.

If it is determined that a camera condition is not satisfied, then at step 218 the mirror remains in the second (e.g., folded) position, and the cameras remain deactivated (e.g., off). The process then returns to step 217. Steps 217-218 thereafter repeat until it is determined in an iteration of step 217 that a camera condition is satisfied.

Once it is determined in an iteration of step 217 that a camera condition is satisfied, then one or more cameras is activated (step 219). In one embodiment, the cameras 104 of FIG. 1 are activated (e.g., turned on) via instructions provided by the processor 142 of FIG. 1. Also in various embodiments, cameras 104 begin taking images, preferably including video images, during step 219.

In certain embodiments, the camera images (e.g., video images) are recorded (step 220). In various embodiments, the recorded images are stored in the memory 144 (e.g., as stored values 154 thereof), and/or on disk 147 of FIG. 1 and/or one or more other storage devices (e.g., memory stick, flash drive, and so on).

In addition, in certain embodiments, the camera images (e.g., video images) are provided to a user of the vehicle (step 222). In various embodiments, the recorded images are streamed online for the user, and/or are transmitted for the user via the transceiver 124 of FIG. 1 (e.g., via a text message, e-mail message, or other electronic message to a smart phone or other electronic device of the user). In yet other embodiments, the camera images are displayed on the display 106 of FIG. 1.

In addition, as data and information continues to be collected and updated as part of steps 204-210 above, a determination is made as to whether the camera condition of step 217 has ended (step 223). In one embodiment, the processor 142 determines whether each camera condition of step 217 has now ended. In other words, in one embodiment, the processor 142 determines whether there are no remaining camera conditions that would warrant continued activation and operation of the cameras 104.

If it is determined in an iteration of step 223 that the camera condition has not ended, then the camera remains activated, and the process returns to step 220. Steps 220-223 thereafter repeat until it is determined in an iteration of step 223 that the camera condition has ended.

Once it is determined in an iteration of step 223 that the camera condition has ended, then the camera is deactivated (step 224). In various embodiments, then the cameras 104 of FIG. 1 are deactivated (e.g., turned off) via instructions provided by the processor 142 of FIG. 1. As a result, the cameras 104 stop taking images, and, accordingly, the transmission, recording, display, and/or streaming of camera images stops.

In addition, as data and information continues to be collected and updated as part of steps 204-210 above, a determination is made as to whether the mirror condition of step 212 has ended (step 225). In one embodiment, the processor 142 determines whether each mirror condition of step 212 has now ended. In other words, in one embodiment, the processor 142 determines whether there are no remaining mirror conditions that would warrant continued placement of the side mirrors 102 in the second (e.g., folded) position.

If it is determined in step 225 that the mirror condition has not ended, then the process returns to step 217. Specifically, as part of a new iteration of step 217, as data and information continues to be collected and updated as part of steps 204-210 above, subsequent determinations are made in new iterations of step 217 as to whether a camera condition is now satisfied.

Conversely, if it is instead determined in step 225 that the mirror condition has ended, then the process proceeds instead to step 226. In various embodiments, during step 226, the processor 142 of FIG. 1 provides additional instructions for movement of the mirror. In certain embodiments, the processor 142 provides additional instructions for the actuator 125 of FIG. 1 to move the side mirrors 102 of FIG. 1 back from the second position to the first position. In certain other embodiments, the processor 142 of FIG. 1 provides additional instructions (e.g., to the display 106 and/or transceiver 124) to provide a notification or suggestion for the user to move the side mirrors 102 back from the second position to the first position.

As noted above, when in the second position, the side mirrors 102 are folded, for example as shown in FIGS. 5 and 6 (discussed further below). Conversely, also in various embodiments, when in the first position, the side mirrors 102 are unfolded, for example as shown in FIGS. 3 and 4 (also discussed further below).

The mirror instructions are implemented (step 228). In certain embodiments, the actuator 125 implements the additional instructions from the processor 142 in moving the side mirrors 102 from the second position to the first position, for example by unfolding the side mirrors 102. In certain other embodiments, the display 106 implements the instructions by providing a notification (e.g., visual and/or audio, within the vehicle 100) for the user to move the side mirrors 102 from the second position to the first position, and/or the transceiver 124 implements the instructions by providing a notification (e.g., via an e-mail or text message to an electronic device of the user) for the user to move the side mirrors 102 from the second position to the first position.

In certain embodiments, the process then terminates at step 230. In other embodiments, one or more steps of the process may continue. For example, in certain embodiments, the process may return to step 202, above.

With reference to FIGS. 3-8, illustrations are provided of various possible positions and movement for a side mirror 102 of the vehicle 100, in accordance with exemplary embodiments of the vehicle 100 and process 200 of FIGS. 1 and 2, set forth above.

First, FIGS. 3 and 4 depict the vehicle 100 with a side mirror 102 disposed in the first position (e.g., an unfolded position). In both FIGS. 3 and 4, a person 302 is depicted in proximity to the vehicle 100. As shown in FIGS. 3 and 4, in the depicted embodiment, when in the first position, the side mirror 102 is unfolded and extended away from the vehicle 100, for example in a typical side mirror position during operation of the vehicle 100 (e.g., in which the driver can easily use the side mirror 102 for looking next to and behind the vehicle 100). Also as shown in FIGS. 3 and 4, in the depicted embodiment, when the side mirror 102 is in the first position, the mounted camera 104 is facing in a downward direction from the side mirror 102. For example, as show in FIG. 3, this results in a field of view direction 304 that is somewhat downward in direction, and that may not provide optimal viewing of the person 302 and/or other vehicle surroundings.

Second, FIGS. 5 and 6 depict the vehicle 100 with a side mirror 102 disposed in the second position (e.g., a folded position). In both FIGS. 5 and 6, the person 302 is depicted in proximity to the vehicle 100. As shown in FIGS. 5 and 6, in the depicted embodiment, when in the second position, the side mirror 102 is folded toward the body 110 of the vehicle 100. Also as shown in FIGS. 5 and 6, in the depicted embodiment, when the side mirror 102 is in the second position, the mounted camera 104 now faces outward from the side mirror 102 (e.g., in a relatively upward, rather than downward, direction from the vehicle 100). For example, as show in FIG. 5, this results in a field of view direction 304 that is somewhat upward in direction, and that may provide more optimal viewing of the person 302 and/or other vehicle surroundings (e.g., as compared with the first position of FIG. 3).

As shown in FIGS. 3-6, in accordance with certain embodiments, when the mirror 102 is in the position shown in FIGS. 5 and 6, the camera 104 is pointing relatively more upward, and can therefore see full height of the person. In contrast, also in certain embodiments, when the mirror 102 is in the position shown in FIGS. 3 and 4, the camera 104 is pointing relatively more downward, and are only able to see the lower part the person.

Figure 7:
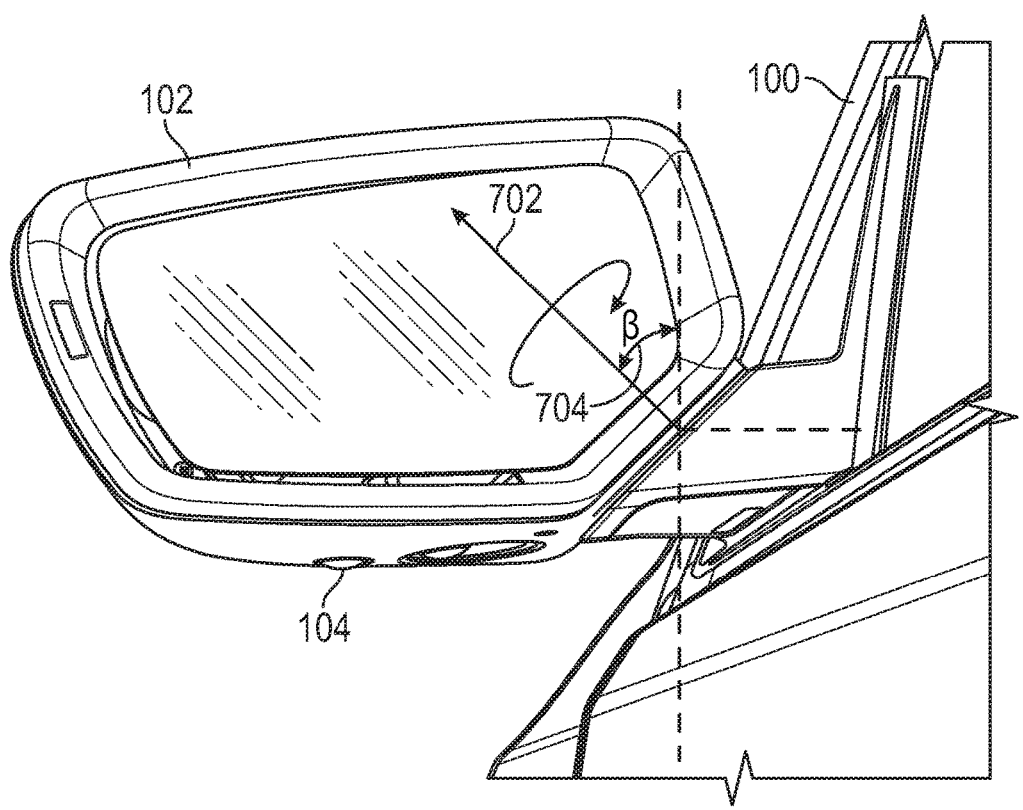
Figure 8:
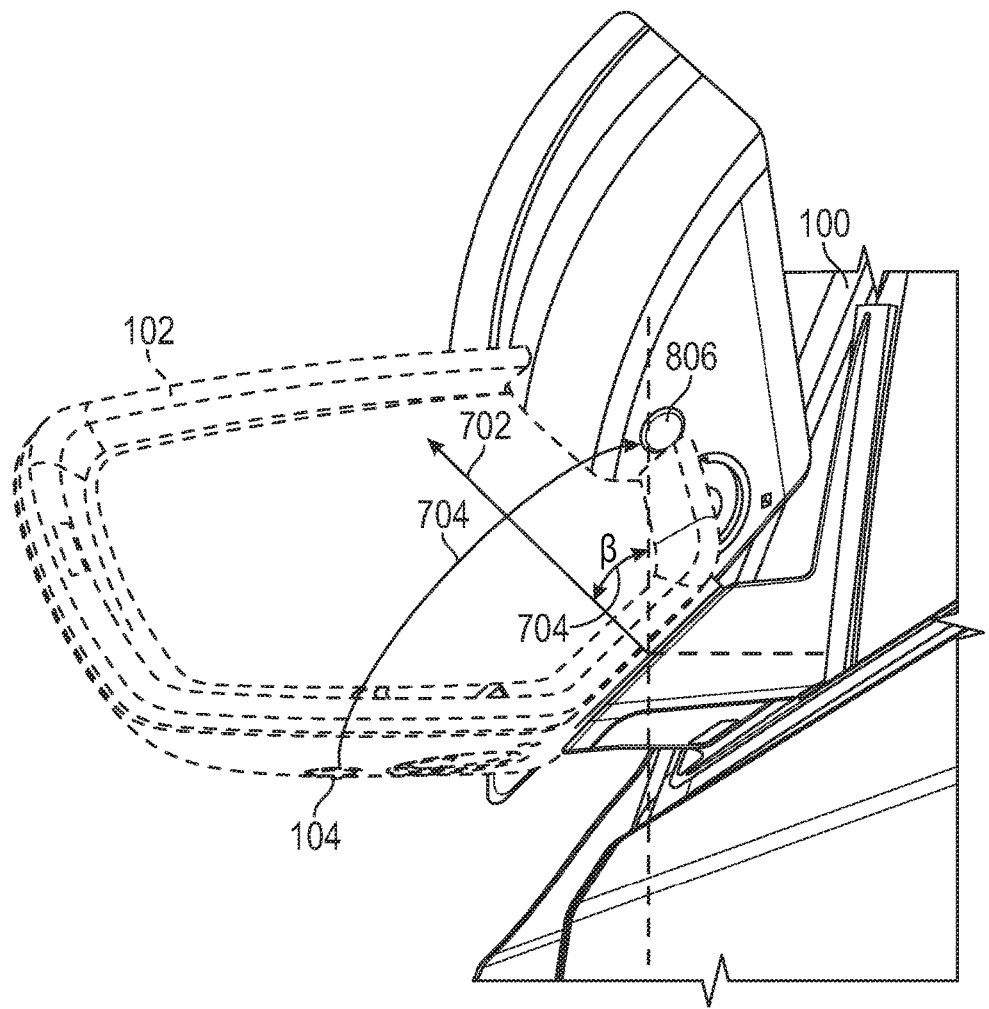

Next with reference to FIGS. 7 and 8, possible angles of rotation are provided for the side mirror 102, in accordance with certain exemplary embodiments of the vehicle 100 of FIG. 1 and the process 200 of FIG. 2. Specifically, in the embodiments of FIGS. 7 and 8, the camera 104 is shown underneath the side mirror 102 when the side mirror 102 is in the first (e.g., unfolded position). When moved between the first and second positions, the side mirror 102 rotates (via the actuator 125 of FIG. 1, in accordance with instructions provided by the processor 142 of FIG. 1) along axis 702 of FIGS. 7 and 8, at an angle 704 (β). As shown in FIG. 8, the camera 104 appears in a new relative position 806 when the side mirror 102 is in the second (e.g., folded) position, with an enhanced (and more upward) field of view of persons in proximity to the vehicle 100 In one exemplary embodiment, the angle 704 (β) is between 60 to 70 degrees. However, this may vary in other embodiments. Also in one embodiment, the angle 704 (β) is determined so as to provide a field of view centered around a person of average height. However, this may also vary in other embodiments. In addition, in one embodiment, FIG. 7 depicts an unfolded (or untilted position) for the mirror 102, and FIG. 8 depicts a folded (or tilted) position for the mirror 102.

Accordingly, methods, systems, and vehicles are provided for automated control of side mirrors of vehicles. As explained in greater detail above, in various embodiments, cameras are mounted on the side mirrors, and the side mirrors and cameras are automatically controlled via a processor based on certain circumstances (e.g., based on the vehicle being parked, in one embodiment), for example in order to provide an enhanced field of view for the camera in certain situations.

It will be appreciated that the systems, vehicles, and methods may vary from those depicted in the Figures and described herein. For example, the vehicle 100, the side mirrors 102, the cameras 104, the control system 108, and/or various components thereof may vary from that depicted in FIGS. 1-8 and described in connection therewith, in various embodiments. It will similarly be appreciated that the steps of the process 200 may differ from those depicted in FIGS. 2-8, and/or that various steps of the process 200 may occur concurrently and/or in a different order than that depicted in FIGS. 2-8, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising the steps of:
   determining whether a condition has been satisfied with respect to a vehicle having a side mirror;
   automatically moving the side mirror from a first position to a second position, via instructions provided by a processor to an actuator, when it is determined that the condition has been satisfied;
   determining whether a second condition has been satisfied; and
   automatically activating a camera mounted on the side mirror, via instructions provided by the processor, when the second condition has been satisfied.

2. The method of claim 1, wherein:
   the step of determining whether a condition has been satisfied comprises determining whether the vehicle is parked; and
   the step of automatically moving the side mirror comprises automatically moving the side mirror from the first position to the second position, via the instructions provided by the processor, when the vehicle is parked.

3. The method of claim 1, wherein:
   the step of determining whether a condition has been satisfied comprises determining whether a vehicle event has occurred for the vehicle; and
   the step of automatically moving the side mirror comprises automatically moving the side mirror from the first position to the second position, via the instructions provided by the processor, when the vehicle event has occurred.

4. The method of claim 1, wherein the step of automatically moving the side mirror comprises automatically folding the side mirror, to thereby move the side mirror from the first position to the second position, via instructions provided by the processor, when it is determined by the processor that the condition has been satisfied.

5. The method of claim 1, wherein the camera captures an enhanced field of view surrounding the vehicle when the side mirror is in the second position.

6. The method of claim 1, further comprising the step of:
   recording images from the camera, when the second condition has been satisfied.

7. The method of claim 1, further comprising the step of:
   providing images from the camera to a user of the vehicle, when the second condition has been satisfied.

8. The method of claim 1, further comprising the steps of:
   determining whether an additional condition has been satisfied; and
   automatically moving the side mirror back from the second position to the first position, when it is determined that the additional condition has been satisfied.

9. A system comprising:
   a processor configured to at least facilitate:
   determining whether a condition has been satisfied with respect to a vehicle having a side mirror; and
   providing instructions for automatic movement of the side mirror from a first position to a second position, when it is determined that the condition has been satisfied; and
   an actuator coupled to the processor and configured to move the side mirror from the first position to the second position based on the instructions provided by the processor when it is determined that the condition has been satisfied;
   wherein the processor is further configured to at least facilitate:
   determining whether a second condition has been satisfied; and
   automatically activating a camera mounted on the side mirror when the second condition has been satisfied.

10. The system of claim 9, further comprising:
    a sensor configured to provide information indicative as to whether the vehicle is parked;
    wherein the processor is further configured to at least facilitate providing instructions for the automatic movement of the side mirror from the first position to the second position, when the vehicle is parked.

11. The system of claim 9, further comprising:
a sensor configured to provide information indicative as to whether a vehicle event has occurred for the vehicle;
wherein the processor is further configured to at least facilitate providing instructions for the automatic movement of the side mirror from the first position to the second position, when the vehicle event has occurred.

12. The system of claim 9, wherein the actuator is configured to automatically fold the side mirror, to thereby move the side mirror from the first position to the second position, via instructions provided by the processor when it is determined by the processor that the condition has been satisfied.

13. The system of claim 9, wherein the camera is configured to capture an enhanced field of view surrounding the vehicle when the side mirror is in the second position.

14. The system of claim 9, further comprising:
a memory;
wherein the processor is further configured to at least facilitate recording images from the camera via the memory, when the second condition has been satisfied.

15. The system of claim 9, further comprising:
a transceiver;
wherein the processor is further configured to at least facilitate providing images from the camera to a user of the vehicle via the transceiver, when the second condition has been satisfied.

16. The system of claim 9, wherein:
the processor is further configured to at least facilitate:
 determining whether an additional condition has been satisfied with respect to the vehicle; and
 provide additional instructions for automatic movement of the side mirror back from the second position to the first position, when it is determined that the additional condition has been satisfied; and
the actuator is configured to move the side mirror back from the second position to the first position based on the additional instructions provided by the processor when it is determined that the additional condition has been satisfied.

17. A vehicle comprising:
a side mirror disposed on a side of the vehicle;
a camera mounted on the side mirror;
a processor configured to at least facilitate:
 determining whether a condition has been satisfied with respect to the vehicle having the side mirror; and
 providing instructions for automatic movement of the side mirror from a first position to a second position, when it is determined that the condition has been satisfied; and
an actuator coupled to the processor and configured to move the side mirror from the first position to the second position based on the instructions provided by the processor when it is determined that the condition has been satisfied;
wherein the processor is further configured to at least facilitate:
 determining whether a second condition has been satisfied; and
 automatically activating a camera mounted on the side mirror when the second condition has been satisfied.

18. The vehicle of claim 17, wherein:
the side mirror is foldable between the first and second positions; and
the camera is configured to capture an enhanced field of view surrounding the vehicle when the side mirror is in the second position.

* * * * *